United States Patent
McKennon-Kelly et al.

(10) Patent No.: US 10,540,459 B2
(45) Date of Patent: Jan. 21, 2020

(54) QUICKDART: OPERATIONAL SPACE DEBRIS VISUALIZATION, CHARACTERIZATION, AND VOLUME MODELING

(71) Applicant: The Aerospace Corporation, El Segundo, CA (US)

(72) Inventors: Ryan Edward George McKennon-Kelly, Springfield, VA (US); Felix R Hoots, Jr., Colorado Springs, CO (US); Brian Whitelaw Hansen, Fairfax, VA (US); David Yengle Stodden, Hawthorne, CA (US)

(73) Assignee: The Aerospace Corporation, El Segundo, CA (US)

( * ) Notice: Subject to any disclaimer, the term of this patent is extended or adjusted under 35 U.S.C. 154(b) by 200 days.

(21) Appl. No.: 15/393,743

(22) Filed: Dec. 29, 2016

(65) Prior Publication Data
US 2018/0189428 A1 Jul. 5, 2018

(51) Int. Cl.
*G06F 17/50* (2006.01)

(52) U.S. Cl.
CPC ...... *G06F 17/5009* (2013.01); *G06F 2217/16* (2013.01)

(58) Field of Classification Search
CPC .................. G06F 17/5009; G06F 2217/16
USPC ........................................................ 703/2
See application file for complete search history.

(56) References Cited

U.S. PATENT DOCUMENTS

| 8,749,545 B2 | 6/2014 | Kelly et al. | |
|---|---|---|---|
| 2011/0221751 A1 | 9/2011 | Kelly et al. | |
| 2013/0170707 A1* | 7/2013 | Hanada | B64G 3/00 382/103 |
| 2015/0088475 A1* | 3/2015 | McKennon-Kelly | B64G 3/00 703/6 |

OTHER PUBLICATIONS

Ryan E. G. McKennon-Kelly et al., "Space Debris Visualization, Characterization, and Volume Modeling" presented at AAS/AIAA Astrodynamics Specialist Conference in 2013.
Ryan E. Kelly et al., "Debris Cloud Visualization", published at AIAA/AAS Astrodynamics Specialist Conference and Exhibits on Aug. 18-21, 2008.

* cited by examiner

*Primary Examiner* — Saif A Alhija
(74) *Attorney, Agent, or Firm* — LeonardPatel PC

(57) ABSTRACT

A computer-implemented method for generating a 3-dimensional (3D) model to characterize and visualize debris. The computer-implemented method includes defining a bounding surface for one or more debris fields generated by an on-orbit breakup event. The bounding surface is defined by using an upper limit fragment spreading speed predicted by a breakup model and applying the upper limit fragment spreading speed in different directions to generate points on the bounding surface. The computer-implemented method also includes connecting one or more points on the bounding surface to maintain a single bounded 3D mesh. The computer-implemented method further includes applying color and/or transparency to the 3D model.

24 Claims, 7 Drawing Sheets

QUICKDART: OPERATIONAL SPACE DEBRIS VISUALIZATION, CHARACTERIZATION, AND VOLUME MODELING

STATEMENT OF GOVERNMENT INTEREST

This invention was made with government support under Contract No. FA8802-14-C-0001 awarded by the Department of the Air Force. The government has certain rights in the invention.

FIELD

The present invention generally pertains to three-dimensional (3D) modeling, and more particularly, to creating a 3D model using a simplified bounding surface for a debris field generated by an on-orbit breakup event.

BACKGROUND

An on-orbit breakup event may occur for a variety of reasons. For example, a breakup event may occur when a satellite collides with another satellite or when unspent propellant explodes. Other methods, both intentional and accidental, may exist that produce a breakup event. In any case, regardless of cause, the breakup of on-orbit mass creates a debris field.

Currently, there are models that show simulated debris particles to help determine whether a satellite will pass through a debris field. For example, Space Debris Visualization and Space Debris Visualization, Characterization and Volume Modeling (the "models") transform a cloud of simulated debris particles into 3D, field based models, to which color and transparency are applied to more accurately communicate risk or threat to space-borne assets. These models are sometimes referred to as "The Torus", and are animated to show evolution of the debris field. Lastly, these models determine whether a satellite will lie within the debris field at any point in time.

However, some of these models may not be generated in real time, and furthermore, these models capture debris at all times throughout the day even if debris is not near a particular localized section. The models may not be appropriate from time, e.g., 0, ~1 day, and may require large intermediate files.

Not only are these models an effective tool for communication, but these models show satellites that are potentially at risk or "in the clear". This is based on whether the satellites will pass through a debris field, for example. While these models are producible once the details of an on-orbit breakup are known, they are computationally intensive and require hours and/or parallel computing resources to generate.

Due to the long production timescale, the models cannot be used to make operational decisions. For instance, the most time consuming part of the process is the generation of the 3D mesh surface, or connectivity matrix, that composes the bounding surface of the cloud. Accordingly, an improved approach to reduce the time in generating the 3D mesh surface may be beneficial.

SUMMARY

Certain embodiments of the present invention may be implemented and provide solutions to the problems and needs in the art that have not yet been fully solved by conventional modeling techniques. For example, some embodiments pertain to generating a 3D model for determining if, and when, a satellite will penetrate or leave a debris cloud.

In an embodiment, a computer-implemented method may be provided for generating a 3D model to characterize and visualize debris. The method may include defining a bounding surface for a debris field by computing an upper limit for the spreading speed of fragments resulting from a collision between the two objects and applying the spreading speed in different directions to produce bounding surface fragments. The debris field may be generated by an on-orbit breakup event in some embodiments. The method may also include connecting one or more points on the bounding surface to maintain a bounded 3D mesh. The method may further include applying color and/or transparency to the 3D model, e.g., based on the computed volume and density of individual segments of the 3D mesh.

In another embodiment, a non-transitory computer readable medium includes a computer program for generating a 3D model to characterize and visualize debris. The computer program, when executed, causes at least one processor to define a bounding surface for a debris field by computing an upper limit for the spreading speed of fragments resulting from a collision between the two objects and applying the spreading speed in different directions to produce bounding surface fragments. The debris field may be generated by an on-orbit breakup event in some embodiments. The computer program further causes the at least one processor to connect one or more points on the bounding surface to maintain a bounded 3D mesh, and apply color and/or transparency to the 3D model, e.g., based on the computed volume and density of individual segments of the 3D mesh.

In yet another embodiment, an apparatus may include memory comprising a set of instructions and at least one processor for generating a 3D model to characterize and visualize debris. The set of instructions, with the at least one processor, is configured to cause the apparatus to define a bounding surface for a debris field by computing an upper limit for the spreading speed of fragments resulting from a collision between the two objects and applying the spreading speed in different directions to produce bounding surface fragments. The debris field may be generated by an on-orbit breakup event in some embodiments. The set of instructions, with the at least one processor, is further configured to cause the at least one processor to connect one or more points on the bounding surface to maintain a bounded 3D mesh, and apply color and/or transparency to the 3D model, e.g., based on the computed volume and density of individual segments of the 3D mesh.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to Quick Debris Analysis Response Tool (QuickDART) for creating a 3D model using a simplified bounding surface for a debris field generated by an on-orbit breakup event. By using the bounding surface, a bounded 3D mesh (or connectivity matrix) connecting various points (or vertices) on the bounding surface can be made to remain constant. While some embodiments described herein reference a single bounded 3D mesh, one of ordinary skill in the art would readily appreciate that the embodiments may also apply to a multiple bounded 3D mesh. This may overcome a significant hurdle in the 3D model generation process, reducing computational time from hours to minutes.

In some embodiments, QuickDART may create the 3D model within a few minutes (e.g., 5 minutes), or fast enough for operational use. QuickDART may consider stochastic treatment of the breakup velocity to achieve this performance.

While the errors are minimal compared to the previous techniques discussed above, QuickDART may provide significantly improved situational awareness. For instance, QuickDART may take an upper limit (i.e., maximum or some percentile) of a fragment spreading speed, which may be predicted by an arbitrary breakup model, and may use the fragment spreading speed to generate a set of points on an initial boundary surface. Each point on the initial boundary surface may receive the same upper limit of the fragment spreading speed, which may be applied relative to the pre-breakup parent object velocity, but applied in different directions. The boundary surface may be computed for each debris cloud in a breakup event. For example, for an explosion, there may be a single cloud, and for a collision, there may be two clouds. This velocity may be used to generate the set of points on the initial boundary surface.

The initial boundary surface may contain all breakup particles with a spreading speed less than the upper limit. Furthermore, the majority of the breakup particles may remain within the bounding surface even as the boundary surface evolves in time. By creating the boundary surface using this technique, a single 3D mesh surface may be computed. This may be based on the upper limit spreading speed boundary particle locations (as vertices) in space and time.

Furthermore, by retaining the unchanging 3D mesh connectivity (e.g., the set of how each single vertex connects to other vertices to form the model), the 3D model can be quickly regenerated by computing the updated position of the vertices at any time of interest. Bounding particles may be initially generated as a series of in-track slices through the debris cloud with spokes in each slice representing each particle. See, for example, FIG. 1, which is a graph 100 illustrating a virtual orbit (delta velocity) discretization of the boundary fragments (applied relative to the parent object's pre-breakup velocity), according to an embodiment of the present invention. In graph 100, each vertex 102-110 may have color associating the vertex with other vertices within its given slice corresponding to the metric visualized on the 3D model.

Figure 1:
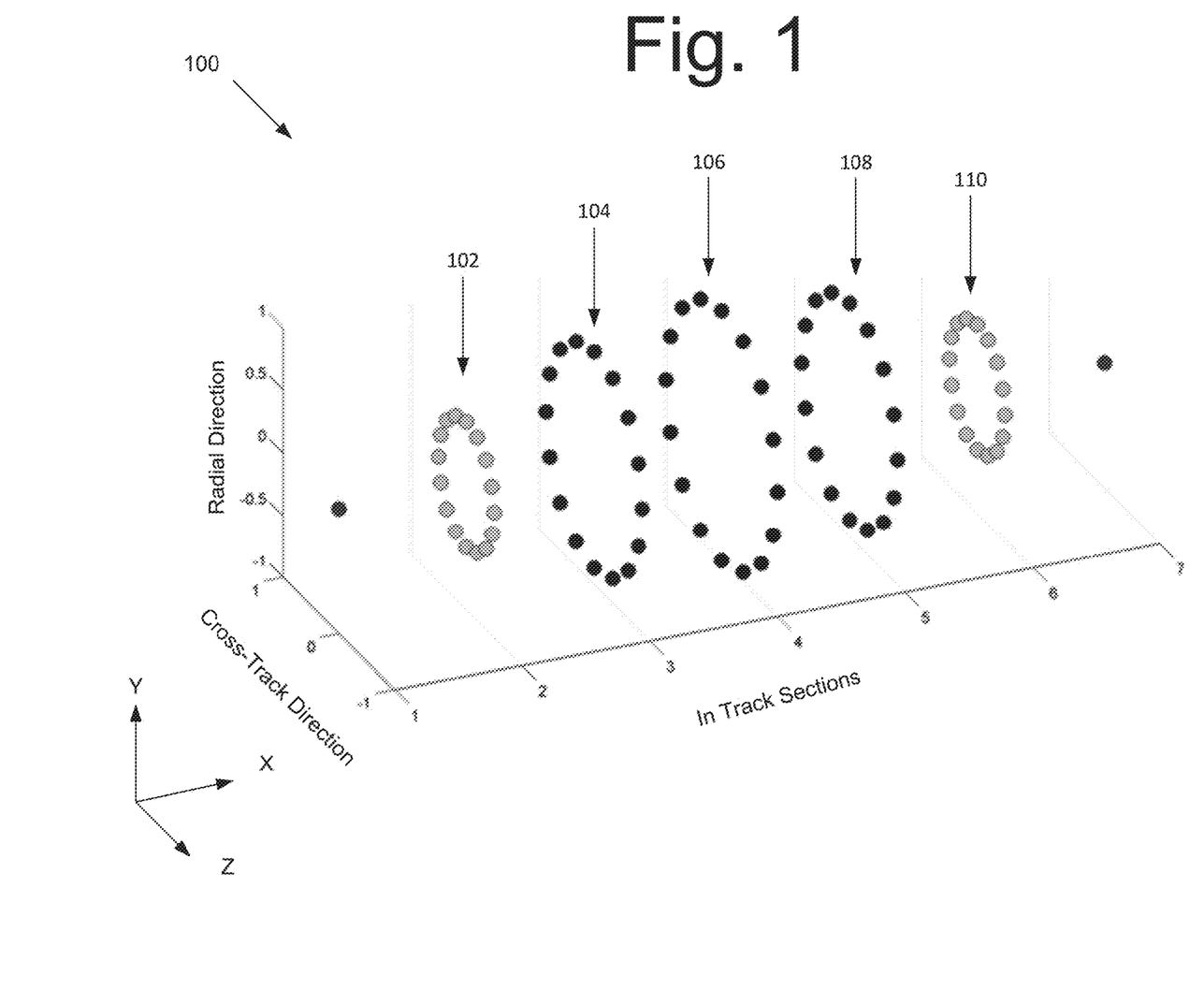
FIG. 1 is a graph 100 illustrating a virtual orbit (delta velocity) discretization from bounding velocity, according to an embodiment of the present invention.

Furthermore, construction of the vertices and their connectivity enables computation of volume and density among individual segments of the 3D model. Segments are regions of the volume bounded by adjacent slices in some embodiments. Slices may include nearly co-planar boundary fragments that have the same initial spreading speed along the in-track (parent orbit velocity) direction. It should be further appreciated that the spreading speed may be the same in all directions. Information from the computation may be used to apply color and/or transparency to the 3D model, providing a simplified representation of danger or other characteristics of interest. The 3D model may determine if, and when, a satellite penetrates or leaves the debris cloud, providing operationally actionable information. Finally, a timeline of penetration intervals may have the same color and transparency applied to it as the region that the satellite has penetrated, condensing pertinent information about the danger (or other characteristics of interest) in a single view for an operator.

Because these slices are constructed in an orderly manner, the volume of the 3D segments between the slices may be easier to compute. It may be possible in some embodiments to calculate the average number of particles in each of these segments to yield a rough approximation of the debris density. This approximation may be displayed as color and/or transparency on the resulting model.

Finally, since the model includes a closed 3D surface, conventional algorithms may be applied to generate intervals for when the satellite(s) cross in and out of the model. For example, one conventional algorithm may involve starting at the satellite model (which may be inside or outside of the debris volume), and direct a ray to a point known to be outside, such as the center of the Earth, or a distant location. From this point, intersections with the mesh surrounding the debris volume may be computed by testing the ray against the polygons formed by connected adjacent points on its surface. For a simple mesh, such as a sphere-shaped mesh, a single ray-polygon intersection indicates that the satellite lies within the debris volume, and an even number of intersections (e.g., 0 or 2) indicates that the satellite lies outside.

However, since meshes have multiple lobes as they wrap around the Earth, the satellite is presumed to lie inside with an odd number of intersections and outside with an even number. One complicating factor is that meshes can be self-penetrating. This situation can defeat the even-odd test, as the satellite can be inside of two nested lobes and the number of intersections will report even. Furthermore, each lobe contributes risk and must be accounted for, so a single inside-outside test will no longer be adequate.

Thus, it may be beneficial to start at the outermost intersection of the ray-mesh intersection, and assign a transit from outside to inside as a minus 1, and from inside to outside as a plus 1. In some embodiments, zero may be the starting point, and a running tally may be kept until the tally reaches the satellite. If the tally sums to a negative value, then absolute value conveys the nesting depth. For example, a tally of minus 2 means the satellite is inside two nested lobes, meaning the risk factor for each nested lobe should be summed. A tally of zero means that the satellite is outside of all lobes, and thus the mesh. It should be appreciated that in some embodiments, a positive non-zero tally may not be realized. If a positive non-zero tally is realized, the mesh is incorrectly constructed.

Figure 2:
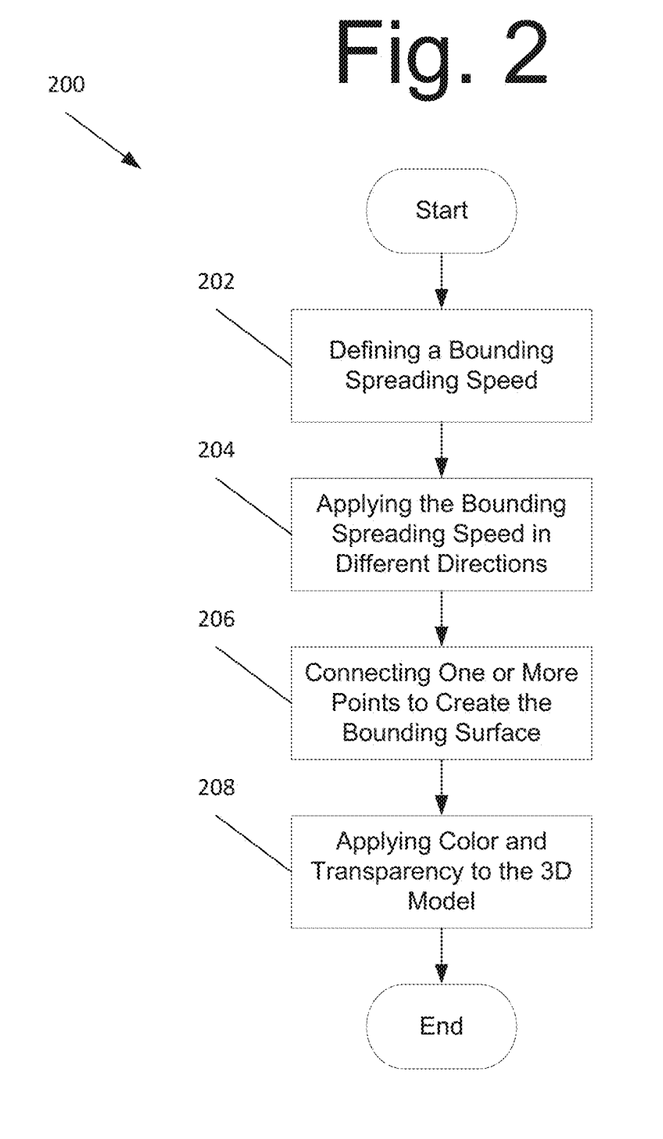
FIG. 2 is a flowchart illustrating a process for generating a 3D model to characterize and visualize debris, according to an embodiment of the present invention.

FIG. 2 is a flowchart illustrating a process 200 for generating a 3D model to characterize and visualize debris, according to an embodiment of the present invention. In some embodiments, the process may begin at 202 with defining a bounding spreading speed for a debris field. The debris field may be generated by an on-orbit breakup event in some embodiments. Furthermore, the debris field may be generated by computing an upper limit for a spreading speed of fragments resulting from a collision between two objects.

At 204, the spreading speed may be applied in different directions to produce fragments of the bounding surface. At 206, one or more points on the bounding surface may be connected to create a bounding surface of a 3D model, and at 208, color and transparency may be applied to the 3D model, for example, by computing a volume and density of individual segments of the boundary surface of the 3D model.

Figure 3:
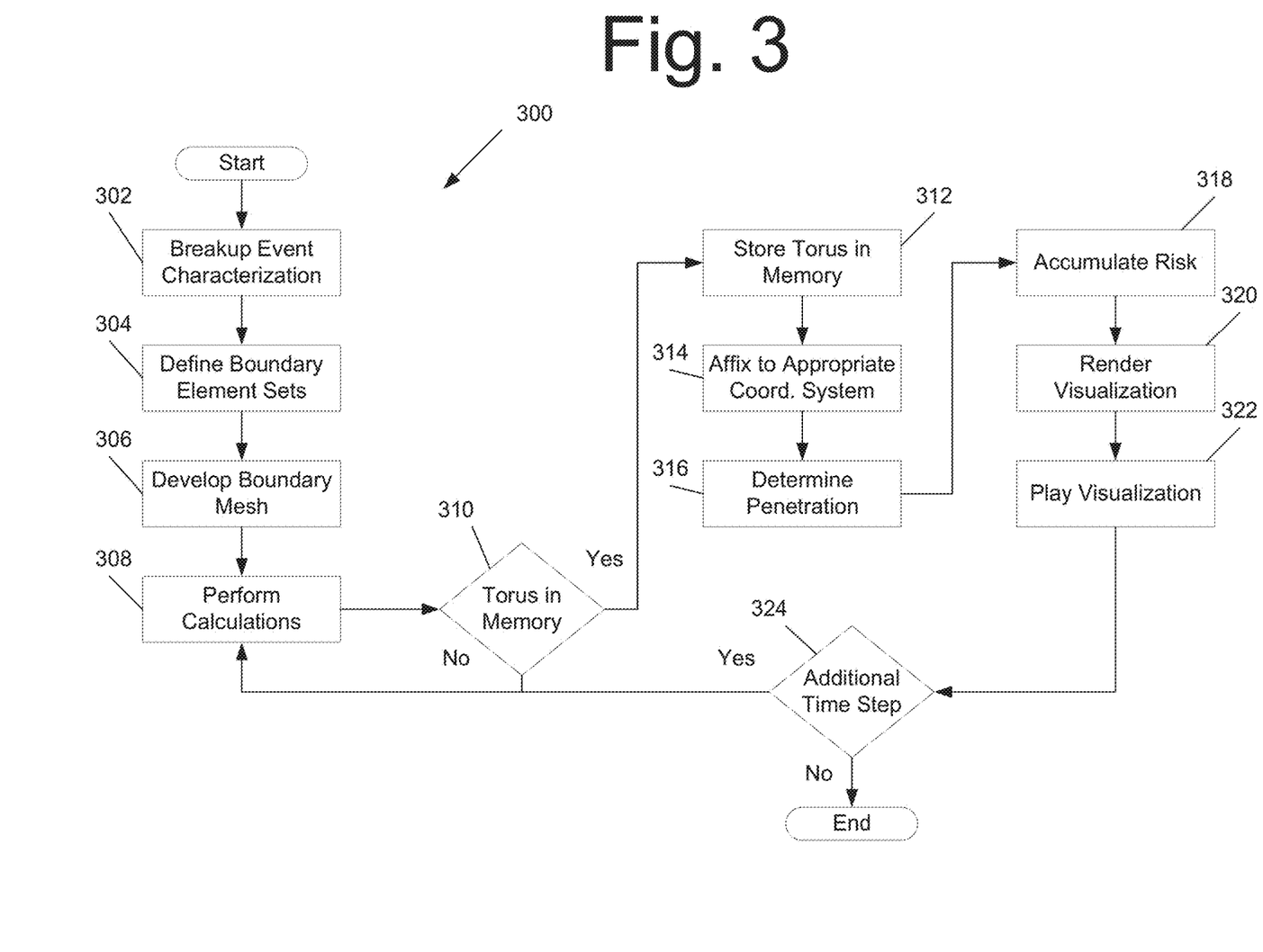
FIG. 3 is a flowchart illustrating a process for creating a 3D model showing a visualization or simulation, according to an embodiment of the present invention.

FIG. 3 is a flowchart illustrating a process 300 for creating a 3D model showing a visualization or simulation, according to an embodiment of the present invention. When a breakup event occurs, process 300 begins with characterizing the breakup event at 302. For example, a breakup event may be characterized using the IMPACT breakup model, which makes use of empirical data and conservation laws to predict a set of breakup fragments of a given size, based on initial conditions of the breakup. This set of predicted fragments can then be analyzed to determine an upper limit spreading speed for the debris field (e.g. by taking the maximum or $90^{th}$ percentile). It should be appreciated, however, that the breakup event may be characterized using any breakup model so long as the surface is characterized with a reasonably simple shape (based on a spreading velocity discretization). For the purposes of explanation, the surface in some embodiments is a sphere. In other embodiments, however, the surface may be an ellipse, for example, allowing for different upper limit spreading speeds as a function of direction.

At 304, boundary element sets are defined based on the selected spreading speed. The spreading speed may be assumed to be isotropic from the point of breakup in some embodiments. This tool may also define particles that have received $\Delta v$, e.g., magnitude and direction. In some embodiments, larger, more massive particles having less $\Delta v$ may be found. The $\Delta v$ shell may be discretized as being applied to a specific particle to artificially create 'virtual' satellites that can be propagated in time. The 'virtual' satellites may represent the bounding surface of the debris cloud, and may need to be 'stitched together' to form a mesh for the 3D model.

Figure 4:
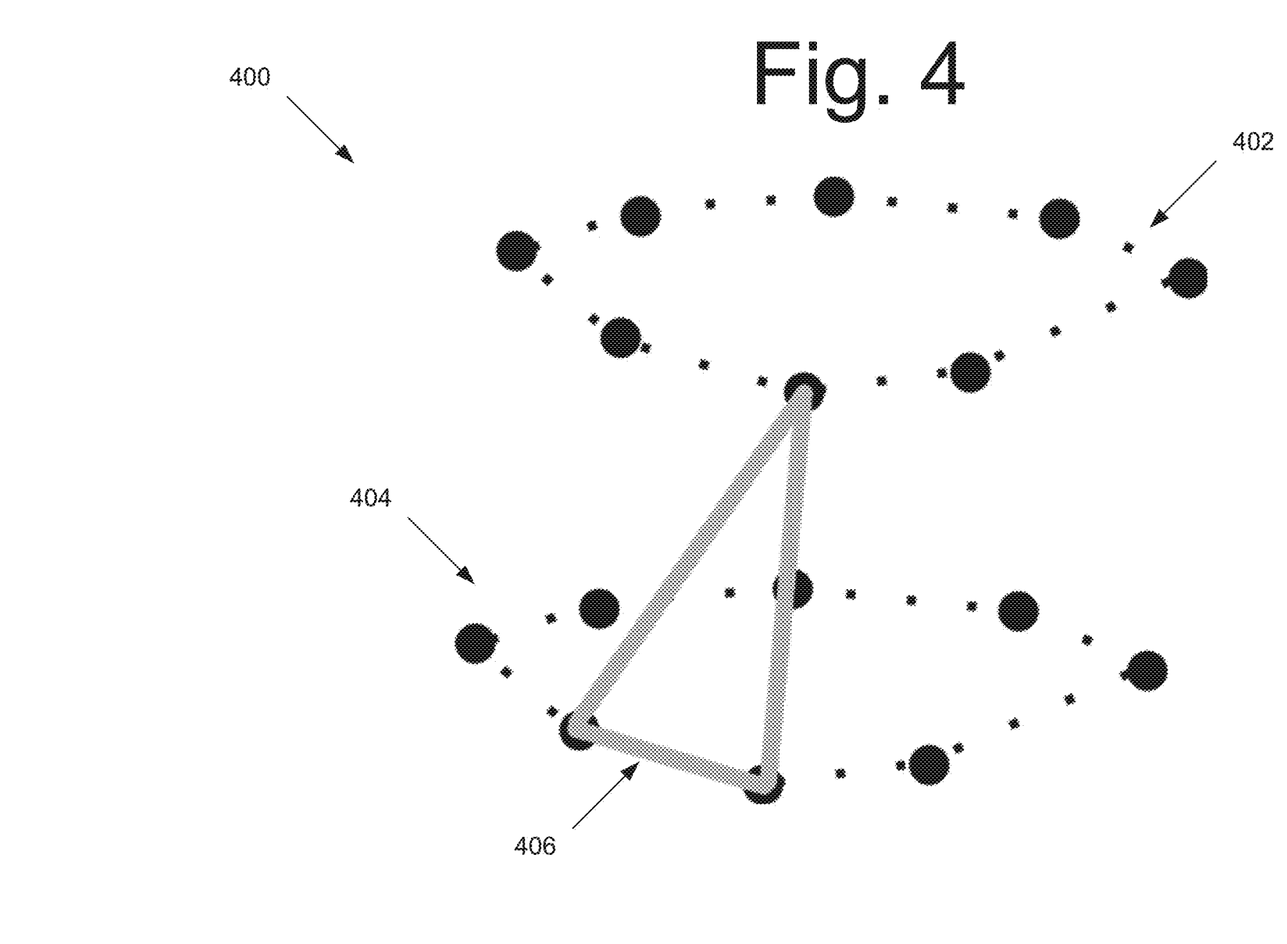
FIG. 4 is a diagram illustrating a connectivity matrix, according to an embodiment of the present invention.

At 306, the boundary mesh (or connectivity matrix) may be developed. FIG. 4, for example, is a diagram illustrating a connectivity matrix 400, according to an embodiment of the present invention. In some embodiments, once a boundary for every two-dimensional (2D) segment has been computed, the boundaries are connected to form a connectivity matrix. By constructing each segment's boundary, a fixed indexing of connectivity between each slice can be quickly defined. For instance, boundary 402 may be defined as [pt1, pt2, pt3, . . . , ptN], boundary 404 may be defined as [ptN+1, ptN+2, . . . , pt2N], and triangle 406 may be defined as pt1→pt2→ptN+2.

Returning to FIG. 3, the process continues to 308. At 308, calculations are performed for each time-step. For example, boundary points are propagated (including any desired orbital perturbations), the density is computed, and coloration and/or transparency are applied to the mesh vertices. In some embodiments, density may be computed using pyramidal frustums and 'wedges' to determine density. Other embodiments may include different computational techniques.

Using the mesh-ray intersection tabulation described above and the average contained particle count for each segment, a particle count for each segment may be obtained. The particle count may correspond to the times and segments where intersections occur, accounting for the nested lobes. A ray direction from the satellite pointed radially away from the center of the Earth may be selected, because this typically corresponds to the shortest dimension of the mesh. The penetrated segment volumes may then be computed using a standard method, and density may then be quantified as the number of particles per segment volume. An overall density for nested lobes may be computed by summing the density of each nested segment, or by using some other computational method. In some embodiments, area and density information may be tagged to each vertex. Also, color and/or transparency may be applied to each vertex. Color and transparency may be calculated from relative density of debris.

At 310, a check is performed to see if torus is in the memory. If not, the process returns to 308. If torus is in the memory, the torus is stored in the memory at 312.

At 314, the stored torus is affixed to an appropriate coordinate system, and at 316, a determination is made to as whether the one or more satellites of interest penetrate at the present time step. This may be accomplished using the above-mentioned ray-mesh intersection techniques.

At 318, the risk associated with each satellite of interest is accumulated, along with the penetration interval. In some embodiments, the risk is accumulated using numerical integration of debris flux. The flux at each time step may be computed as the satellite area, multiplied by the local cloud density, multiplied by the relative velocity between the penetrating satellite of interest and the cloud fragments. In some embodiments, the cloud fragment velocity is estimated as the velocity of the parent object translated to the point on its orbit closest to the penetrating satellite. In other embodiments, the cloud fragment velocity is estimated as the velocity of the nearest boundary fragment. In some embodiments, the integrated flux (or fluence) may be converted to risk. Fluence may be determined by sampling the density to compute the flux at each time step, and integrating these measurements over the time interval of interest. At times that the satellite lies outside of the mesh, a density of zero (yielding zero flux) is recorded, and at times where the satellite is inside of the mesh, the tabulated sum of flux measurements is accrued in accordance with the lobe nesting depth.

Also, in some embodiments, the location of the satellite is also determined for coloring the penetration interval. See, for example, FIG. 6. This may be accomplished by establishing a grey or in some embodiments a color scale, which is assigned to a logarithmic scale of density. Although a default scale is provided by the software, the scale can be changed to accommodate the operator's requirements. In some embodiments, at each time step, a color may be recorded for each satellite based on the particle density being encountered. The entire collection of samples may then be organized into a horizontal bar for each satellite, with a time scale increasing from left to right in the display. See, for example, FIG. 6, which shows density timelines for each GeoSat, i.e., for GeoSat 1 to GeoSat 4.

At 320, the visualization is rendered. In the display, the evolving meshes are rendered with the rotating Earth as a backdrop. A color scale (e.g., blue to red) may be used to show particle density, as does a separate scale from transparent (no risk) to opaque (maximum risk). Although a standard depth buffering technique may be used to blend the ordering of the meshes with the Earth and space backdrop, the use of transparency may add an additional complication, since the most distant polygons are rendered first to prevent visual artifacts from occurring. In other words, all mesh polygons may have to be depth-sorted and rendered in the order of distance from the viewer.

At 322, the visualization is played, and at 324, a determination is made as to whether additional time steps exist. If so, the process returns to 308; otherwise, the process ends. It should be appreciated that in some embodiments the number of time steps may be predetermined ahead of the QuickDART rendering, causing process 300 to loop until the simulation is outside of the generation interval. In some other embodiments, the number of time steps may be dynamic instead of an operator inputting the duration over which the Torus should be shown.

Figure 5:
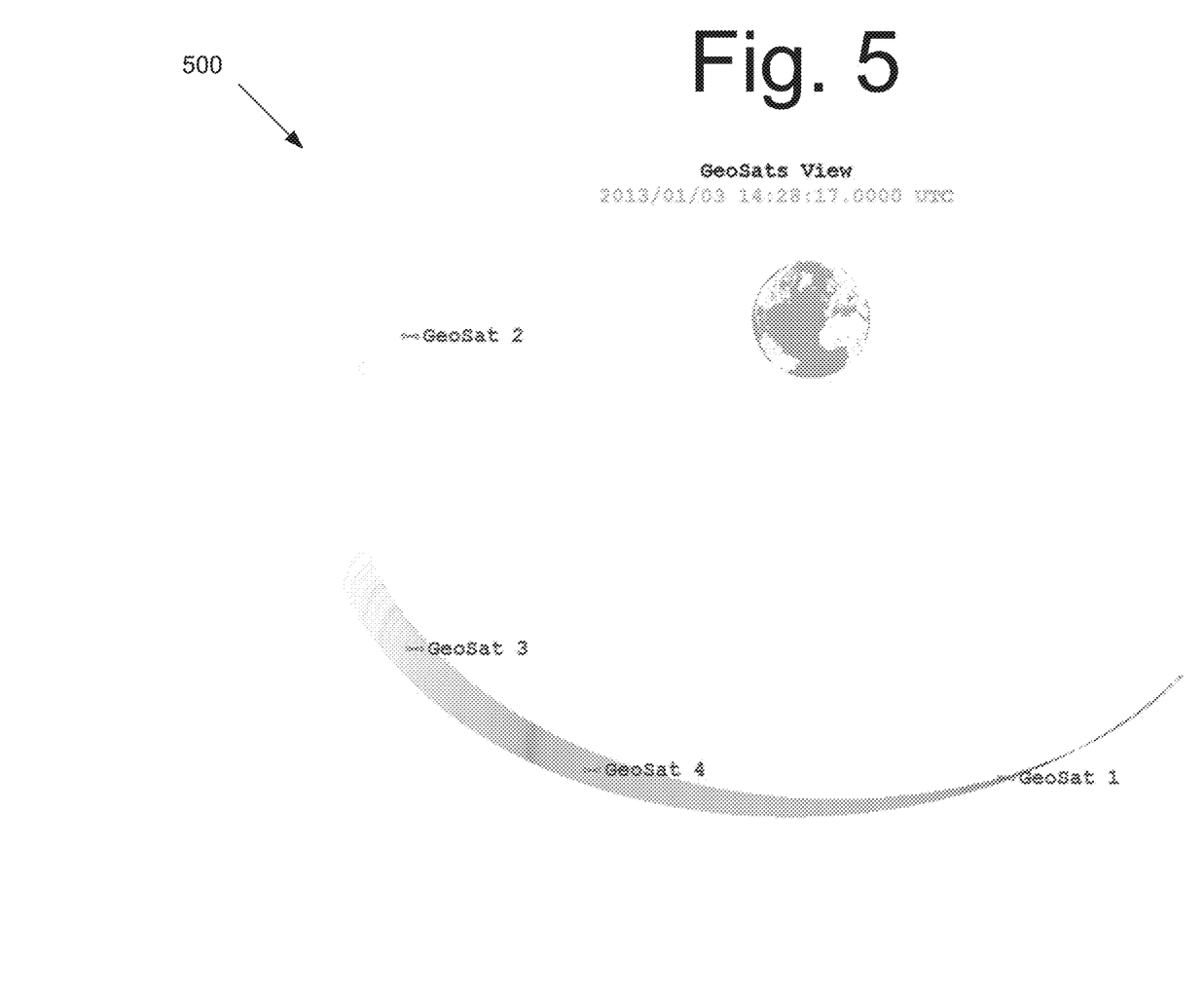
FIG. 5 illustrates an image showing the location of breakup at a geosynchronous altitude of an inclined orbit, according to an embodiment of the present invention.

FIG. 5 illustrates an image 500 showing the location of breakup at a geosynchronous altitude of an inclined orbit, according to an embodiment of the present invention. In this embodiment, one reference satellite (GeoSat 2) is visualized as clearly external to the torus, while three other satellites (GeoSat 1, GeoSat 2, and GeoSat3) appear to be inside the torus.

Figure 6:
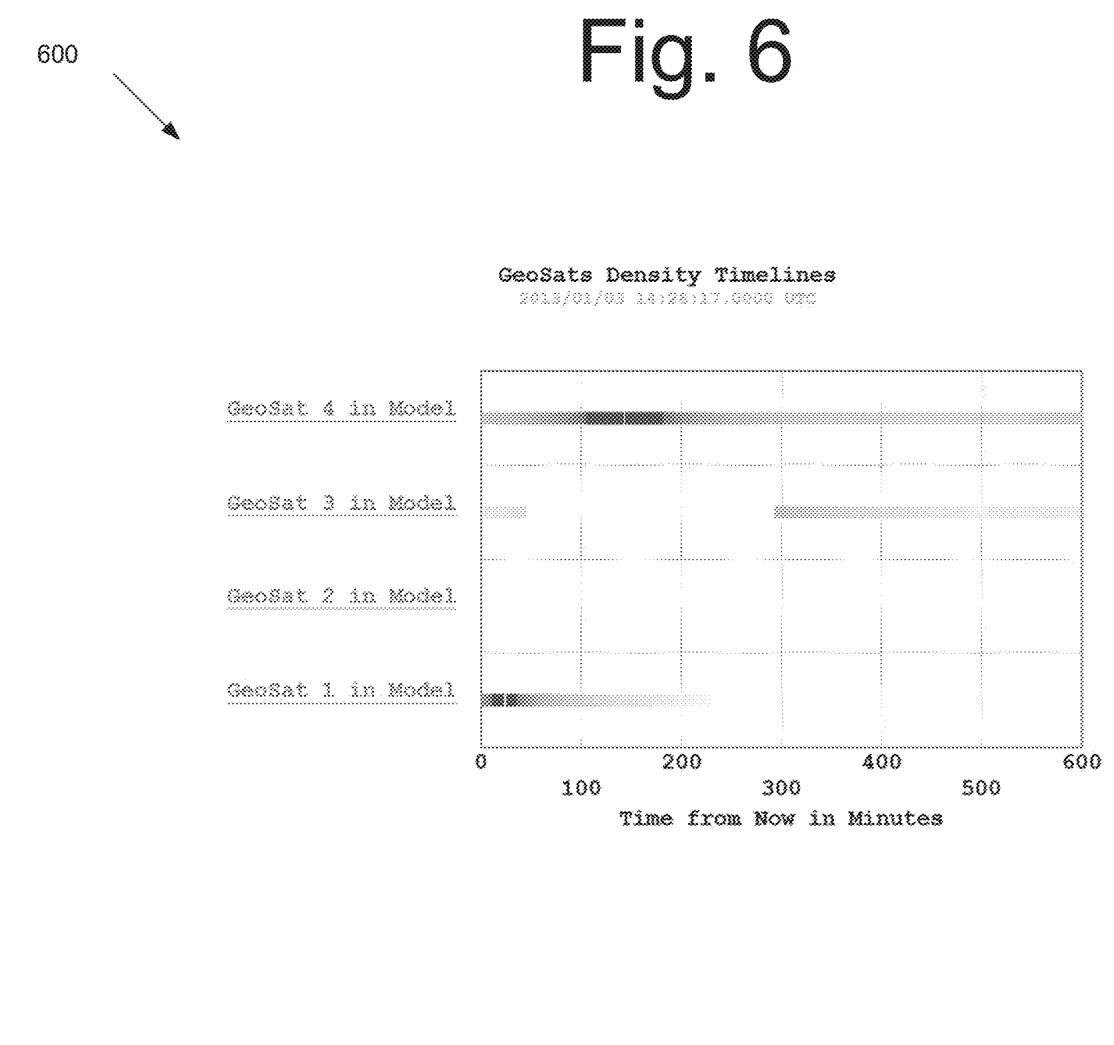
FIG. 6 is a graph illustrating a calculated penetration interval of GeoSat 1-GeoSat 4, according to an embodiment of the present invention.

FIG. 6 is a graph 600 illustrating a calculated penetration interval for GeoSat 1, GeoSat 3, and GeoSat 4, according to an embodiment of the present invention. In graph 600, an operator may likely realize that GeoSat 2 is not at risk. However, from graph 600, the operator would clearly know that GeoSat 1, GeoSat 3, and GeoSat 4 may be in danger. From graph 600, it may be possible to predict and show when these penetration intervals will occur in the future, which gives the operator time to react and possibly maneuver, or otherwise, to place the satellite into a "safe-hold" or more survivable orientation.

Figure 7:
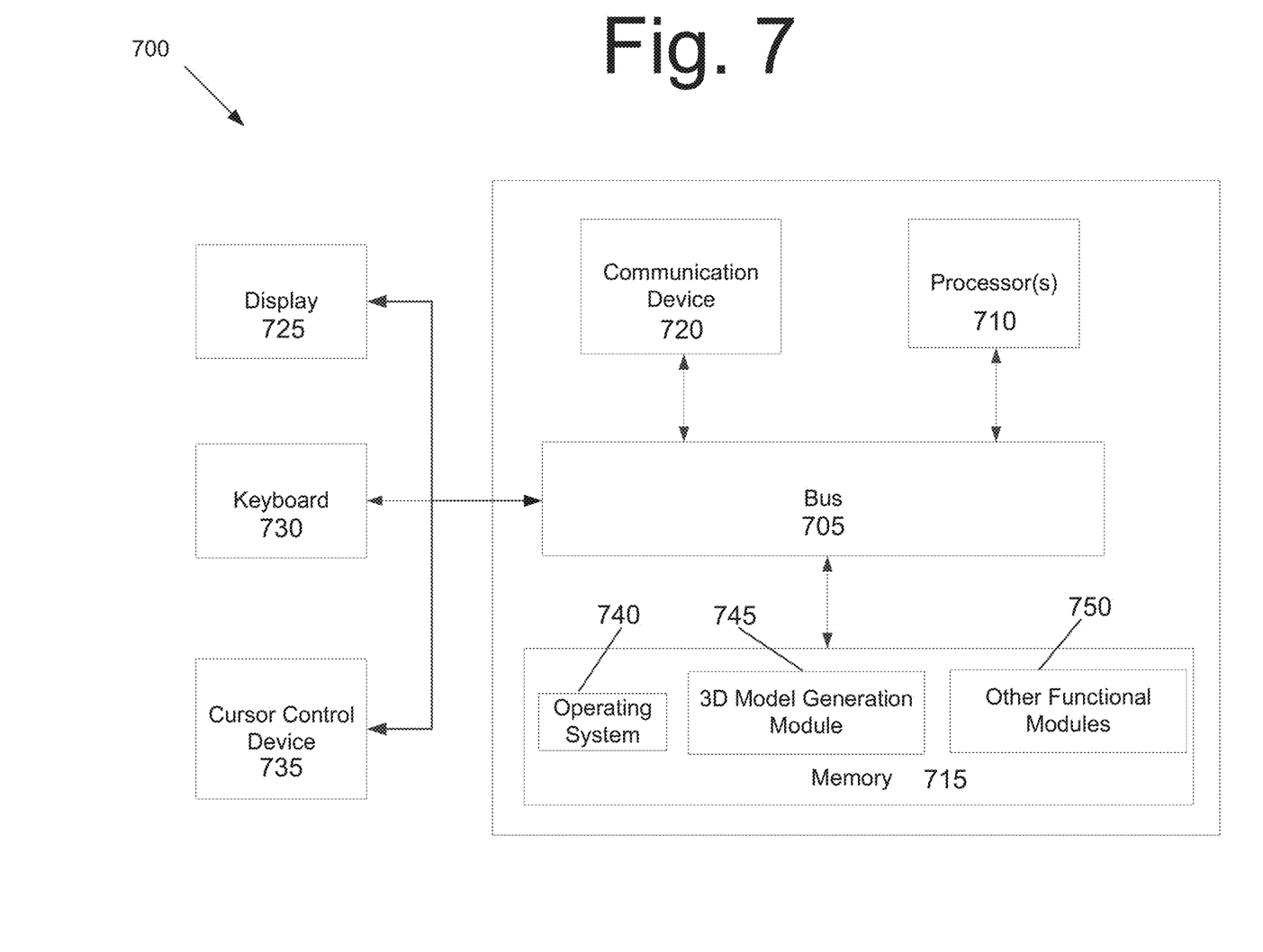
FIG. 7 is a circuit diagram illustrating computing system for generating a 3D model to characterize and visualize debris, according to an embodiment of the present invention

FIG. 7 is a circuit diagram illustrating a computing system (the "system") 700 for generating a 3D model to characterize and visualize debris, according to an embodiment of the present invention. System 700 may be executed by the process shown in FIGS. 2 and 3. System 700 includes a bus 705 or other communication mechanism for communicating information, and processor(s) 710 coupled to bus 705 for processing information. Processor(s) 710 may be any type of general or specific purpose processor, including a central processing unit ("CPU") or application specific integrated circuit ("ASIC"). Processor(s) 710 may also have multiple processing cores, and at least some of the cores may be configured for specific functions. System 700 further includes a memory 715 for storing information and instructions to be executed by processor(s) 710. Memory 715 can be comprised of any combination of random access memory ("RAM"), read only memory ("ROM"), flash memory, cache, static storage such as a magnetic or optical disk, or any other types of non-transitory computer-readable media or combinations thereof. Additionally, system 700 includes a communication device 720, such as a transceiver, to wirelessly provide access to a communications network.

Non-transitory computer-readable media may be any available media that can be accessed by processor(s) 710 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 710 are further coupled via bus 705 to a display 725, such as a Liquid Crystal Display ("LCD"), for displaying the 3D model discussed above. A keyboard 730 and a cursor control device 735, such as a computer mouse, are further coupled to bus 705 to enable a user to interface with system 700. However, in certain embodiments such as those for mobile computing implementations, a physical keyboard and mouse may not be present, and the user may interact with the device solely through display 725 and/or a touchpad (not shown). Any type and combination of input devices may be used without deviating from the scope of the invention. Furthermore, in certain embodiments, such input devices are not present at all.

Memory 715 stores software modules that provide functionality when executed by processor(s) 710. The modules include an operating system 740 for system 700. The modules further include a 3D model generation module 745 that is configured to generate a 3D model for debris characterization and visualization. System 700 may include one or more additional functional modules 750 that include additional functionality. The one or more additional modules may include a penetration module, risk calculation module, or any module that would produce the desired results consistent with the embodiments described herein.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for generating a 3-dimensional (3D) model to characterize and visualize debris in real-time, comprising:

characterizing a breakup event, when a breakup event occurs, wherein the characterizing of the breakup event comprising analyzing a set of predicted fragments to determine an upper limit spreading speed for a debris field, the upper limit spreading speed being maximum of all fragment spreading speeds in the debris field, wherein the maximum fragment spreading speed is determined by a fragment in a collection of fragments having maximum speed, and a user selectable percentile of the maximum fragment spreading speed is specified to be a percentile of speeds to be encapsulated;

defining a plurality of boundary elements based on the upper limit spreading speed;

creating a single bounded 3D mesh comprising of a plurality of segments, wherein each of the plurality of segments comprising a set of slices, each slice within the set of slices comprises the plurality of boundary elements, the creating of the single bounded 3D mesh comprises connecting one or more boundary elements within the slice with each other or connecting one or more boundary elements within the set of slices with each other; and performing one or more calculations at each time-step and applying color and/or transparency to the 3D model, wherein the performing of the one or more calculations at each time-step comprises changing positioning of each of the one or more boundary elements with the slice or within the set of slices while maintaining connectivity between each of the one or more boundary elements within the slice or within the set of slices, such that the single bounded 3D mesh remains unchanged, allowing the 3D model to be regenerated by computing updated positioning of each of the one or more boundary elements within the slice or the set of slices at any time of interest, and during the performing of the one or more calculations at each time-step avoids reconnecting of the one or more boundary elements within the slice with each other or reconnecting of the one or more boundary elements within the set of slices with each other.

2. The computer-implemented method of claim 1, wherein a boundary spreading speed is predicted by a breakup model, and the boundary spreading speed is applied in different directions to generate the one or more boundary fragments, which define the bounding surface.

3. The computer-implemented method of claim 2, wherein each of the one or more boundary fragments receive an upper limit fragment spreading speed applied relative to a velocity of a pre-breakup parent object.

4. The computer-implemented method of claim 2, wherein the bounding surface encompasses one or more breakup particles with a spreading speed less than the upper limit fragment spreading speed.

5. The computer-implemented method of claim 1, further comprising:
calculating one or more penetration interval for one or more satellites, showing when the one or more satellites enter and exit the debris cloud.

6. The computer-implemented method of claim 5, wherein
the calculating of the one or more penetration intervals comprises recording at each time step a color and transparency for the one or more satellites, and
organizing an entire collection of the recordings into a horizontal bar for each of the one or more satellites with a time scale.

7. The computer-implemented method of claim 1, further comprising:
computing a debris flux at each time step as a satellite area, multiplied by a local cloud density and a relative velocity between a penetrating satellite of interest and cloud fragments.

8. The computer-implemented method of claim 7, further comprising:
calculating a risk associated with one or more satellites of interest using the numerical integration of debris flux.

9. A non-transitory computer readable medium comprising a computer program for generating a 3-dimensional (3D) model to characterize and visualize debris in real-time, the computer program, when executed, is configured to cause at least one processor to:
characterize a breakup event, when a breakup event occurs, wherein the characterizing of the breakup event comprising analyzing a set of predicted fragments to determine an upper limit spreading speed for a debris field;
define boundary elements based on the upper limit spreading speed, the upper limit spreading speed being maximum of all fragment spreading speeds in the debris field, wherein the maximum fragment spreading speed is determined by a fragment in a collection of fragments having maximum speed, and a user selectable percentile of the maximum fragment spreading speed is specified to be a percentile of speeds to be encapsulated;
create a single bounded 3D mesh comprising of a plurality of segments, wherein each of the plurality of segments comprising a set of slices, each slice within the set of slices comprises the plurality of boundary elements, the creating of the single bounded 3D mesh comprises connecting one or more boundary elements within the slice with each other or connecting one or more boundary elements within the set of slices with each other; and
perform one or more calculations at each time-step and apply color and/or transparency to the 3D model, wherein
during the performing of the one or more calculations at each time-step, changing positioning of each of the one or more boundary elements with the slice or within the set of slices while maintaining connectivity between each of the one or more boundary elements within the slice or within the set of slices, such that the single bounded 3D mesh remains unchanged, allowing the 3D model to be regenerated by computing updated positioning of each of the one or more boundary elements within the slice or the set of slices at any time of interest.

10. The non-transitory computer readable medium of claim 9, wherein a boundary spreading speed is predicted by a breakup model, and the boundary spreading speed is applied in different directions to generate the one or more boundary fragments, which define the bounding surface.

11. The non-transitory computer readable medium of claim 10, wherein each of the one or more boundary fragments receive an upper limit fragment spreading speed applied relative to a velocity of a pre-breakup parent object.

12. The non-transitory computer readable medium of claim 10, wherein the bounding surface encompasses one or more breakup particles with a spreading speed less than the upper limit fragment spreading speed.

13. The non-transitory computer readable medium of claim 9, wherein the computer program is further configured to cause the at least one processor to:
calculate one or more penetration interval for one or more satellites, showing when the one or more satellites enter and exit the debris cloud.

14. The non-transitory computer readable medium of claim 13, wherein the computer program is further configured to cause the at least one processor to:
record at each time step a color and/or transparency for the one or more satellites, and
organize an entire collection of the recordings into a horizontal bar for each of the one or more satellites with a time scale.

15. The non-transitory computer readable medium of claim 9, wherein the computer program is further configured to cause the at least one processor to:
compute a debris flux at each time step as a satellite area, multiplied by a local cloud density and a relative velocity between a penetrating satellite of interest and cloud fragments.

16. The non-transitory computer readable medium of claim 15, wherein the computer program is further configured to cause the at least one processor to:
calculate a risk associated with one or more satellites of interest using the numerical integration of debris flux.

17. An apparatus for generating a 3-dimensional (3D) model characterizing and visualizing debris in real-time, comprising:
memory comprising a set of instructions; and
at least one processor, wherein
the set of instructions, with the at least one processor, is configured to cause the apparatus to
characterize a breakup event, when a breakup event occurs, wherein the characterizing of the breakup event comprising analyzing a set of predicted fragments to determine an upper limit spreading speed for a debris field;
define boundary elements based on the upper limit spreading speed, the upper limit spreading speed being the maximum of all fragment spreading speeds in the debris field, wherein the maximum fragment spreading speed is determined by a fragment in a collection of fragments having maximum speed, and a user selectable percentile of the maximum fragment spreading speed is specified to be a percentile of speeds to be encapsulated;
create a single bounded 3D mesh comprising of a plurality of segments, wherein each of the plurality of segments comprising a set of slices, each slice within the set of slices comprises the plurality of boundary elements, the creating of the single bounded 3D mesh comprises connecting one or more boundary elements within the slice with each other or connecting one or more boundary elements within the set of slices with each other; and perform one or more calculations at each time-step and apply color and/or transparency to the 3D model, wherein during the performing of the one or more calculations at each time-step, changing positioning of each of the one or more boundary elements with the slice or within the set of slices while maintaining connectivity between each of the one or more boundary elements within the slice or within the set of slices, such that the single bounded 3D mesh remains unchanged, allowing the 3D model to be regenerated by computing updated positioning of each of the one or more boundary elements within the slice or the set of slices at any time of interest.

18. The apparatus of claim 17, wherein a boundary spreading speed is predicted by a breakup model, and the boundary spreading speed is applied in different directions to generate the one or more boundary fragments, which define the bounding surface.

19. The apparatus of claim 18, wherein each of the one or more boundary fragments receive an upper limit fragment spreading speed applied relative to a velocity of a pre-breakup parent object.

20. The apparatus of claim 18, wherein the bounding surface encompasses one or more breakup particles with a spreading speed less than the upper limit fragment spreading speed.

21. The apparatus of claim 17, wherein the set of instructions, with the at least one processor, is further configured to cause the apparatus to:

calculate one or more penetration interval for one or more satellites, showing when the one or more satellites enter and exit the debris cloud.

22. The apparatus of claim 21, wherein the set of instructions, with the at least one processor, is further configured to cause the apparatus to:

record at each time step a color and/or transparency for the one or more satellites, and organize an entire collection of the recordings into a horizontal bar for each of the one or more satellites with a time scale.

23. The non-transitory computer readable medium of claim 17, wherein the set of instructions, with the at least one processor, is further configured to cause the apparatus to:

compute a debris flux at each time step as a satellite area, multiplied by a local cloud density and a relative velocity between a penetrating satellite of interest and cloud fragments.

24. The non-transitory computer readable medium of claim 23, wherein the set of instructions, with the at least one processor, is further configured to cause the apparatus to:

calculate a risk associated with one or more satellites of interest using the numerical integration of debris flux.

* * * * *